United States Patent [19]
Vickers

[11] Patent Number: 5,659,467
[45] Date of Patent: Aug. 19, 1997

[54] MULTIPLE MODEL SUPERVISOR CONTROL SYSTEM AND METHOD OF OPERATION

[75] Inventor: Kenneth G. Vickers, Whitesboro, Tex.

[73] Assignee: Texas Instruments Incorporated, Dallas, Tex.

[21] Appl. No.: 672,468

[22] Filed: Jun. 26, 1996

[51] Int. Cl.$^6$ .............................. G05B 15/02; G05B 19/18
[52] U.S. Cl. ............................................ 364/138; 364/180
[58] Field of Search ...................... 364/130, 138, 364/496, 189, 550, 551.01, 551.02, 552, 553, 554, 180; 395/159, 161

[56] References Cited

U.S. PATENT DOCUMENTS

| | | | |
|---|---|---|---|
| 5,388,058 | 2/1995 | Yamada | 364/554 |
| 5,396,433 | 3/1995 | Kosugi | 364/468 |
| 5,448,470 | 9/1995 | Nishihata et al. | 364/131 |
| 5,448,490 | 9/1995 | Gottlieb et al. | 364/478 |
| 5,452,465 | 9/1995 | Geller et al. | 395/800 |
| 5,485,620 | 1/1996 | Sadre et al. | 395/700 |
| 5,517,404 | 5/1996 | Biber et al. | 364/138 |
| 5,530,848 | 6/1996 | Gilbert et al. | 364/600 |
| 5,553,003 | 9/1996 | Harada et al. | 364/492 |

*Primary Examiner*—Reba I. Elmore
*Assistant Examiner*—Ramesh Patel
*Attorney, Agent, or Firm*—Richard L. Donaldson; Wade James Brady; Rose Alyssa Keagy

[57] ABSTRACT

A multiple model supervisor control system (24) for use in a manufacturing environment (10) including a plurality of model based statistical process control units ($14_1$–$14_N$) associated with equipment (#1–#N) is provided. The multiple model supervisor control system (24) includes a database (16) storing model coefficient shift data representing statistically significant drifts in output measurables that are associated with the model based statistical process control units ($14_1$–$14_N$). A supervisor control unit (26) is coupled to the database (16) and is operable to access the coefficient shift data stored in the database (16). A multiple model map (30) of coefficient shift history is generated by the supervisor control unit (26) and shows the coefficient shift data against a common domain. A user interface (28) is coupled to the supervisor control unit (26) to provide user access to the multiple model map (30) to allow identification of problems caused by equipment drift and problems caused by environmental change.

20 Claims, 3 Drawing Sheets

MULTIPLE MODEL SUPERVISOR CONTROL SYSTEM AND METHOD OF OPERATION

TECHNICAL FIELD OF THE INVENTION

This invention relates in general to the field of manufacturing control systems, and more particularly to a multiple model supervisor control system and method of operation.

BACKGROUND OF THE INVENTION

In a manufacturing environment, equipment is operated to produce a product. It is important to detect when an equipment process has drifted, is no longer on target and is producing products that do not meet specifications.

The process can then be corrected such that the equipment is back on target. One method of accomplishing this control is statistical quality control. Statistical quality control comprises measuring some of the specifications of a product and plotting those measurements on a chart. The measurements are plotted run after run of the equipment. When a statistically significant variation is identified, some correction to the equipment is made. Rules for determining when a statistically significant deviation occurs have been created. The most common rules in use are the WECO rules which allow an operator to make measurements, put the measurements on a graph, and then take an appropriate action.

Statistical process control is an advancement upon statistical quality control. Statistical process control comprises judging measurements against the most recent measurement norm, instead of a fixed target. In other words, measured values are tracked versus the difference from a normal value rather than in terms of the actual measured value. Within the area of statistical process control, model based statistical process control has been developed.

In model based statistical process control, a relationship is defined between measurable output of the equipment and the control settings and other inputs to the equipment. The quality of the product being produced can be related to the status of the equipment. The relationship can be empirical or a theoretical model.

In general, a model based statistical process control unit uses a model of the equipment process. The control unit re-tunes the model by changing one or more model coefficients to shift the mean of the distribution back to center any time the equipment drifts away from where it should be. A minimum and maximum value can be set for each coefficient to keep re-tuning by the control unit from driving the equipment too far away from expected normal operating values.

In a model based statistical process control unit, a relationship is established between product measurables and the equipment control settings used. This relationship or model can be tuned by changing one or more coefficients that define the model. As equipment variations occur, the actual measured data could fall below or rise above an expected value predicted by the model for given control settings. A drift away from the expected value can be detected. The model based statistical process control unit can then re-calculate and determine new model coefficients for the equipment control settings in order to tune the model to the current operating characteristics of the equipment. A minimum and maximum model coefficient can be defined to prevent drifting too far from a normal process. If the coefficient passes these limits, the operation of the equipment can be shut down to determine why the equipment has drifted so far off baseline norms.

With such model based statistical process control units, a tuning event comprising a coefficient shift, occurs only when a statistically valid drift of equipment parameters has occurred. Thus, the information that is provided by the coefficient shifts is variation from mean that is statistically significant. A coefficient can be plotted against time to see the stability of a piece of equipment in a valid form regardless the time period viewed.

However, model based statistical process control suffers from a number of problems. There is no way to know from coefficient shift information from a piece of equipment whether the model re-tuning is caused by variables associated with the equipment, by the manufacturing environment, or by some other source. In order to make such a determination, it is necessary to gather large amounts of information from other information sources and spend time analyzing possible causes. It is difficult for an engineer or operator using equipment having a model based statistical process control unit to efficiently diagnose problems caused by environmental change as opposed to equipment specific problems.

SUMMARY OF THE INVENTION

Therefore a need has arisen for a manufacturing control system that allows an engineer or operator to efficiently identify problems caused by equipment drift and problems caused by environmental change.

In accordance with the present invention, a multiple model supervisor control system is provided that substantially eliminates or reduces disadvantages and problems associated with previously developed manufacturing control systems.

According to one embodiment of the present invention, a multiple model supervisor control system for use in a manufacturing environment including a plurality of model based statistical process control units associated with equipment is provided. The multiple model supervisor control system includes a database storing model coefficient shift data representing statistically significant drifts in output measurables that are associated with the model based statistical process control units. A supervisor control unit is coupled to the database and is operable to access the coefficient shift data stored in the database. A multiple model map of coefficient shift history is generated by the supervisor control unit and shows the coefficient shift data against a common domain. A user interface is coupled to the supervisor control unit to provide user access to the multiple model map to allow identification of problems caused by equipment drift and problems caused by environmental change.

According to another embodiment of the present invention, a method is provided for operating a computer system to provide a multiple model supervisor control system for use in a manufacturing environment that includes a plurality of model based statistical process control units associated with equipment. A database is created that stores model coefficient shift data received from the plurality of model based statistical process control units. A multiple model map of coefficient shift history is generated by showing the coefficient shift data for the equipment against a common domain. The multiple model map of coefficient shift history is then analyzed to identify problems caused by machine drift and problems caused by environmental change.

A technical advantage of the present invention is the ability to supervise multiple models, each running self tuning processes with respect to manufacturing equipment. An engineer or operator is allowed to supervise whether the equipment is operating as it is supposed to operate. In addition, an engineer or operator is allowed to view a multiple model map of the coefficient shift history for the manufacturing equipment.

Another technical advantage of the present invention is allowing identification of problems caused by equipment drift and problems caused by environmental change.

A further technical advantage of the present invention is the generation of a multiple model map of coefficients versus a common domain. This provides the ability to perform opportunistic maintenance of the equipment by identifying coefficients that are reaching limits, coefficients that are changing rapidly and coefficients that are changing in parallel for supervised equipment.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein.

DETAILED DESCRIPTION OF THE INVENTION

Figure 1:
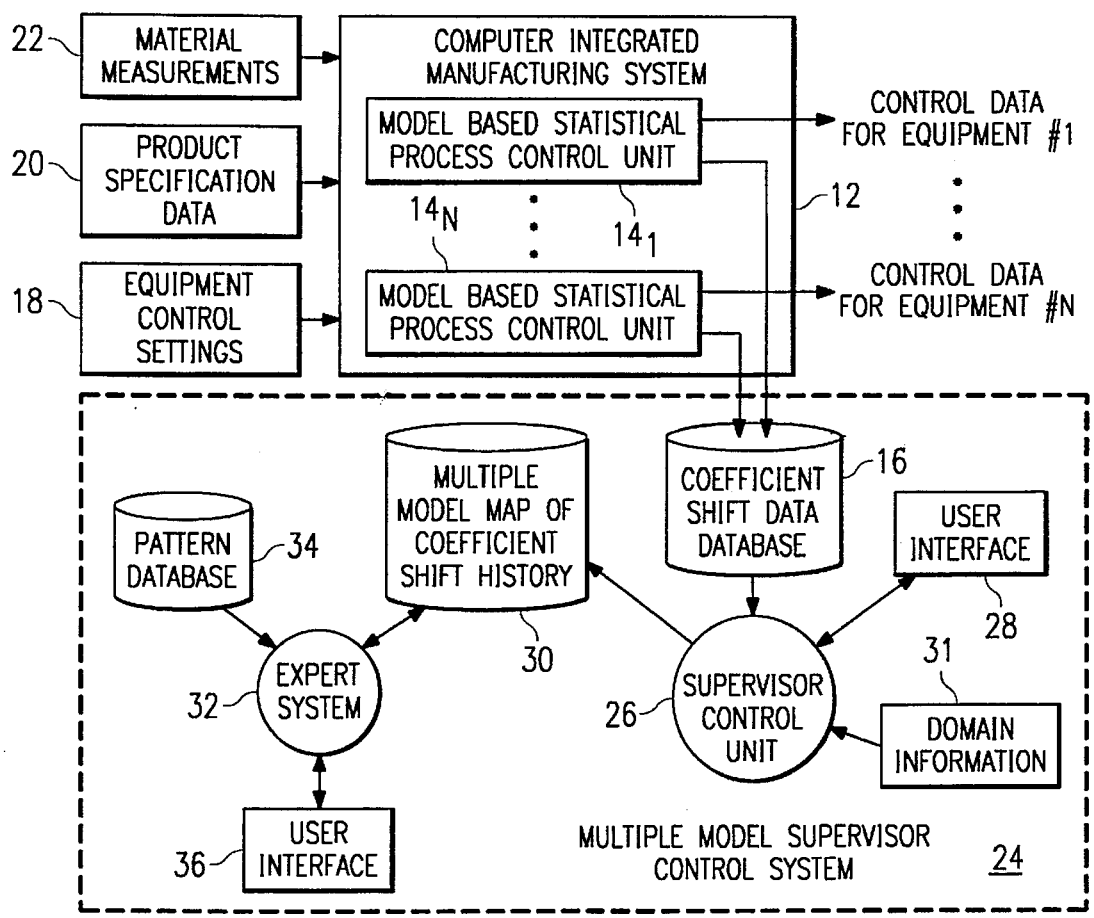
FIG. 1 is a block diagram of a manufacturing environment including a multiple model supervisor control system constructed according to the teachings of the present invention.

FIG. 1 illustrates a manufacturing environment, indicated generally at 10. Manufacturing environment 10 comprises a manufacturing site producing products through the operation of one or more pieces of equipment. Manufacturing environment 10 includes such things as physical surroundings (temperature, humidity, etc. ), input materials (gases, liquids, etc.) and metrology or other measurement equipment. Manufacturing system 10 includes a computer integrated manufacturing system 12. Computer integrated manufacturing system 12 provides automation control software for manufacturing environment 10.

Manufacturing system 12 comprises a plurality of model based statistical process control (SPC) units $14_1, 14 \ldots 14_N$. Each model based SPC unit $14_1$–$14_N$ provides control data for associated equipment. In the illustrated embodiment, model based SPC unit $14_1$ provides control data for equipment #1, and model based SPC unit $14_N$ provides control data for equipment #N. Model based SPC units $14_1$–$14_N$ also provide coefficient shift data to a data base 16. In other embodiments of the present invention, more than one model based SPC unit is associated with a single piece of equipment.

Manufacturing system 12 receives equipment control settings data 18 from the equipment #1–#N associated with model based SPC units $14_1$–$14_N$. Manufacturing system 12 also receives product specification data 20 and material measurements data 22. Equipment control settings data 18 represents the actual control settings on equipment #1–#N. Product specification data 20 represents maximum limits for measurables of the products being manufactured. Material measurements data 22 represents actual measured values for output measurables of material being processed.

Database 16 is one element of a multiple model supervisor control system 24. Supervisor control system 24 also comprises a supervisor control unit 26 coupled to a user interface 28. Supervisor control unit is coupled to database 16 and generates a multiple model map 30 of coefficient shift history. Supervisor control unit 26 receives domain information 31. Domain information 31 comprises events that have occurred that change the state of equipment #1–#N, environmental conditions, processing history, time, and other information suitable as a common domain for coefficient shift data. Supervisor control system 24 further comprises an expert system 32 coupled to a pattern database 34 and to a user interface 36.

In operation, model based SPC units $14_1$–$14_N$ use product specification data 20, material measurements data 22, and equipment control settings data 18 to monitor and control operation of equipment #1 through equipment #N. Model based SPC unit $14_1$ is discussed below as an example.

Model based SPC unit $14_1$ comprises a model defining a relationship between output measurables and inputs for equipment #1. Material measurements data 22 is measured for the product being produced by equipment #1, and the equipment control settings for equipment #1 are fed to unit $14_1$. Model based SPC unit $14_1$ operates to track measured values versus the difference from normal values for products produced by equipment #1.

Model based SPC unit $14_1$ re-tunes the model to shift the mean of distribution back to center when equipment #1 drifts away from desired operation parameters. Model based SPC unit $14_1$ re-tunes the model by shifting coefficients for the model. A shift in the coefficient translates to changes in the control settings for equipment #1 which is transmitted as the control data for equipment #1. This control data can either be automatically fed into equipment #1 or can be accessed and input by an operator.

For example, model based SPC unit $14_1$ may be associated with equipment #1 comprising an ion implanter that uses a relationship between dosage and implant sheet resistance. As equipment variations occur, the actual measured material data could start falling below or rising above an expected value for the implant sheet resistance. When the delta from the expected value is trended by run, a drift away from the expected value can be detected by model based SPC unit $14_1$. Model based SPC unit $14_1$ can then re-calculates the best fit model and determine a new control coefficient. This new control coefficient comprises a coefficient shift to tune the model to current operation of equipment #1. The coefficient shift is provided to database 16. Model based SPC unit $14_1$ then transmits new control data for equipment number one according to the new coefficient. Model based SPC unit $14_1$ can be designed such that a tuning event only occurs when a statistically valid drift of equipment occurs. Thus, a plot of the coefficient versus time provides a view of equipment and process stability in a valid form regardless the time period viewed.

In operation, the coefficient shift data for model based SPC units $14_1$–$14_N$ are received and stored by database 16. In this manner, database 16 stores coefficient shift data that represent the statistically significant drifts in operation parameters of the equipment associated with model based SPC control units $14_1$–$14_N$.

Supervisor control unit 26 is operable to access coefficient shift data stored in database 16. Supervisor control unit 26 can generate a multiple model map 30 which shows coefficient shift data history against a common domain. In one embodiment of the present invention, the common domain comprises time. Other suitable common domains are possible including manufacturing events.

Supervisor control unit 26 is operable to automatically generate a multiple model map 30 every time an equipment run completes or every time a coefficient shift occurs. This would automatically provide access to supervise current operation parameters of the equipment and manufacturing environment 10. Supervisor control unit 26 is also operable to generate a multiple model map 30 based upon a user invoked request. A user can request generation of multiple model map 30 using user interface 28. User interface 28 comprises an input and output device allowing a user to interact with supervisor control unit 26 and to allow supervisor control unit 26 to display or provide multiple model map 30 to the user.

Multiple model map 30 comprises a map of the coefficient shift history for the equipment. Multiple model map 30 can comprise any suitable combination of multiple model coefficient shift data mapped against a common domain. Multiple model map 30 allows supervision of multiple models each running self tuning processes for associated equipment. Multiple model map 30 reflects the occurrence of any coefficients approaching limits, any coefficients changing rapidly in isolation, any coefficients changing in parallel for a number of pieces of equipment, or any other possible combinations of independent, interactive, or dependent coefficient movement.

Independent coefficient movement is movement by two models have moving coefficients caused by separate and independent causes. Dependent coefficient movement is movement by two models due to the same cause. Interactive coefficient movement is movement by two models where movement in a first model produces movement in a second model. An example of an interactive coefficient movement is the effect that a shift in deposition equipment caused by metrology measurements that are too thick would have on etching equipment that follows the deposition equipment in the process. The deposition time is decreased due to the faulty metrology measurements. The etch time then also decreases due to layers being thinner than expected.

User interface 28 provides user access to multiple model map 30 of coefficient shift history. Multiple model map allows user identification of problems caused by equipment drift and problems caused by environmental change. Because multiple model map 30 shows coefficient shift history for model based SPC units $14_1$–$14_N$ against a common domain, a user can distinguish problems caused by equipment drift of one isolated piece of equipment from problems caused by an environmental change affecting all pieces of equipment. Thus, a user is allowed to efficiently identify and distinguish root causes of problems which results in higher factory utilization through reduced equipment downtime and allows opportunistic maintenance.

Expert system 32 provides an automated identification process for identifying problems from repeating patterns that appear in multiple model map 30. Expert system 32 is operable to access pattern database 34. Pattern database 34 comprises a plurality of patterns known to indicate problems with equipment or with the manufacturing environment. User interface 36 is operable to provide user access to expert system 32 and to allow expert system 32 to display information to the user. Expert system 32 allows automatic analysis of coefficient shift changes that occur in repeating and identifiable patterns. This allows analysis of problems not compensated for in the model that forms the basis of model based SPC control units $14_1$–$14_N$. Expert system 32 provides the ability to identify repetitive patterns over time or events affecting equipment in the manufacturing environment. Of course, the identification performed automatically by expert system 32 could be performed manually by a user using user interface 28.

An example of a manufacturing environment is discussed hereafter to further explain the advantages of the present invention. In this example embodiment, equipment #1 through equipment #N comprise twelve oxidation furnaces all running different steps in a wafer oxidation process. With respect to these furnaces, the introduction of steam produces the oxide thickness. After each process step the product is measured on a single metrology instrument to determine the oxide thickness.

In this example, the metrology instrument is not measuring accurately (measuring each object N% high) and is becoming more and more inaccurate as time passes (measuring (N+X)% high). However, the operators of the furnaces do not know the metrology instrument is inaccurate. The cycle for each furnace is one hour, and there are six cycles per day. The furnaces are timed such that every 15 to 20 minutes there is a product produced. Thus, oxide thickness data is measured every 15 to 20 minutes. Due to the inaccuracy of the measuring instrument, the model based SPC units $14_1$–$14_N$ for each furnace make coefficient shifts after a statistically significant number of cycles with high thickness.

At some point, a furnace would shut down. The shut down would occur because one of the model based SPC units will have continued to shift the process until the coefficient is beyond the limits. In fact, what has happened, is that the inaccuracy of the metrology instrument caused the model based SPC unit to drive the furnace out of its allowable control setting operating range. Although the furnace may be producing oxide thicknesses exactly as it is supposed to, the inaccuracy of the metrology instrument caused a shutting down of the equipment.

Without the advantages of the present invention, an engineer or operator is likely to respond to the shutting down of the first furnace by analyzing problems with that furnace. The focus would be on that single furnace and not on the other furnaces. This is due to the fact that the other furnaces, as best as would be told, are operating within normal parameters. However, all twelve of the furnaces would eventually shut down over a relatively short period of time due to the inaccuracy of the metrology measuring instrument.

A technical advantage provided by the present invention is the ability to supervise the coefficient shifts of multiple model based SPC units for the furnaces. Analysis of a multiple model map of the coefficient shift history for these furnaces would show all of the furnaces changing in the same direction over the same time period as the metrology equipment worsened. This allows an engineer or operator to identify the problem as one caused by an environmental change rather than a problem caused by the monitored equipment's drift. Without the present invention, no such efficient identification of an environmental change problem rather than an equipment drift problem could be accomplished.

Figure 2:
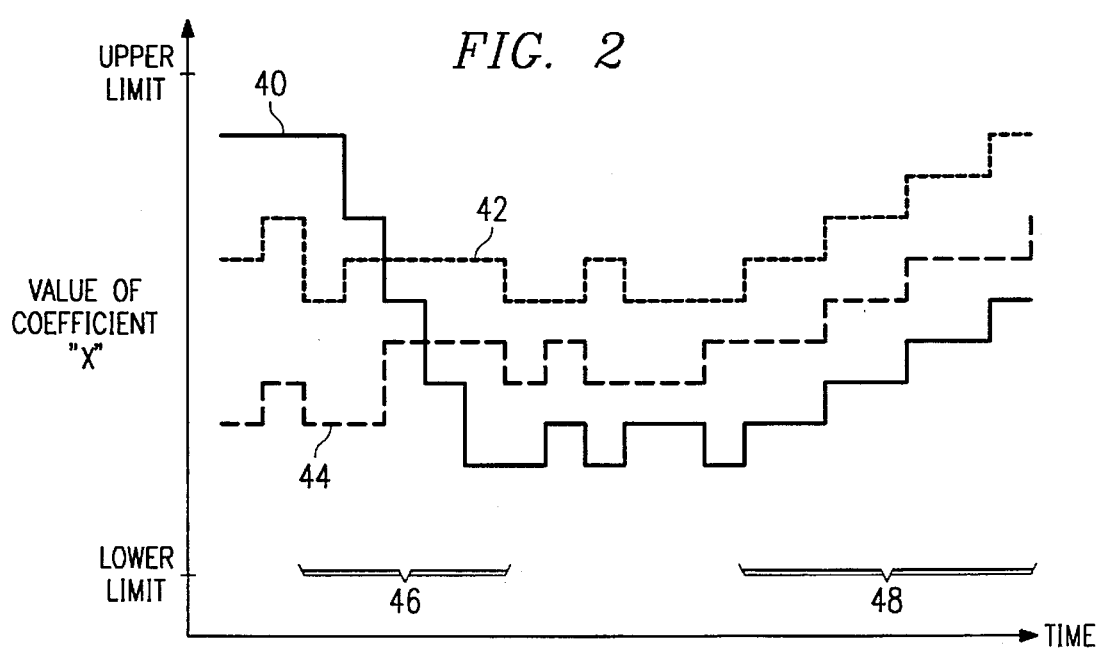
FIG. 2 illustrates one embodiment of a multiple model map of coefficient shift data for three pieces of equipment according to the teachings of the present invention.

FIG. 2 illustrates one embodiment of a multiple model map of coefficient shift history according to the teachings of the present invention. In the embodiment of FIG. 2, a thermal deposition process is running on three furnaces. This type of process may be strongly affected by such things as moisture content in the nitrogen supply, temperature within the furnace, and liquid source temperature.

As shown in FIG. 2, the value of coefficient "X" for each furnace can be mapped against time. Coefficient shift history 40 comprises the coefficient shift mapping for the first furnace. Likewise, coefficient shift history 42 comprises the coefficient shift data mapping for the second furnace, and coefficient shift history 44 comprises the mapping of the coefficient shift data for the third furnace.

If only individual furnace coefficients were monitored over time, a change in the process inputs would be seen only as a rapidly changing coefficient. However, the cause of the coefficient change would not be apparent. According to the teachings of the present invention, all three furnaces are monitored by a multiple model supervisor control system. This allows the potential causes of the coefficient changes to be differentiated between equipment shift as opposed to environmental change.

For example, in a region 46, coefficient shift history 42 and coefficient shift history 44 show that the second and third furnaces have random small changes in coefficient "X." However, in region 46, coefficient shift history 40 for the first furnace shows a rapidly decreasing coefficient. Using the multiple model map of FIG. 2, an engineer or operator can diagnose the problem in region 46 as a problem unique to the first furnace and comprising an equipment drift. One cause could be a leak in the first furnace's gas jungle, a problem in the first furnace's temperature control system or a problem in the first furnace's source temperature control. An environmental cause is not suspected because only one furnace in the bank shows a problem.

In region 48, however, all three furnaces have rapidly increasing coefficient values for "X." Because all three furnaces are changing at the same time in the same manner, the problem can be identified as a problem caused by environmental change. An engineer or operator can focus investigative effort at items that would affect all three furnaces rather than a single furnace's process inputs. In this example, a probable cause would be moisture in the banks nitrogen supply, a bad reference thermocouple used for temperature profiling, or a shift in the wafer metrology equipment.

As can be seen, with the multiple model supervisor control system of the present invention, two different problem investigation areas were generated from the multiple model map of FIG. 2. Without the benefits of the present invention, the most routine course of investigation in region 48 would be to eliminate single furnace possible problems before looking for environmental problems.

The present invention is operable to supervise coefficient patterns over years as a common domain. This would allow an engineer to observe interactions between gross environmental changes and the manufacturing process. For example, whether winter outside temperature versus summer outside temperature produces identifiable patterns.

By applying new knowledge and programming techniques such as pattern matching, it is possible to allow an expert system to be able to detect other subtle repetitive patterns in a process mapped as coefficients over time. One example would be a process that is affected by the number of microns of deposited film on the substrate tooling. This coefficient pattern would appear as a saw tooth pattern of varying period, with each equipment's new sawtooth starting at a different point in time as determined by a tooling change event. Thus, a multiple model map of the coefficients against the tooling change event would provide repeating patterns and allow identification of such a problem.

The present invention allows supervision of multiple models in model based SPC units in a complex manufacturing environment. Each model based SPC unit models the interaction between input factors and output measurables. Output measurables from each of the equipment can be judged against the output predicted by the current model. If sufficient runs occur with statistically significant deviation from expected output, the model can re-tune and create new coefficients that better describe current data.

The supervisor control system of the present invention receives the coefficient shifts from the model based SPC control units and maps the coefficient shifts against a common domain. The ability to supervise multiple models can prevent an inopportune shutdown due to automatic limits for coefficients in each model based SPC unit. Such shutdowns caused by a model re-tune may come at a time that causes significant interruption in factory flow.

According to the teachings of the present invention, a multiple model supervisor control system monitors of coefficients multiple models at one time on the same common domain. The multiple models may deal with multiple observables in one piece of equipment, may deal with multiple pieces of equipment using the same model, or some combination of the two.

The present invention provides the technical advantage of allowing identification of equipment specific causes of variation from environmentally created process drifts. As a model's coefficients change only when a statistically significant variation from norm occurs, monitoring the coefficient changes across time indicate process stability. By looking for patterns in the coefficient changes, a system can be built that would indicate increased probability of a root cause being from one source as opposed to the other possible sources. A key separation of root causes involves deciding if the process drift is equipment related, or if it is instead caused by some change in the environment around the equipment.

Figure 3A:
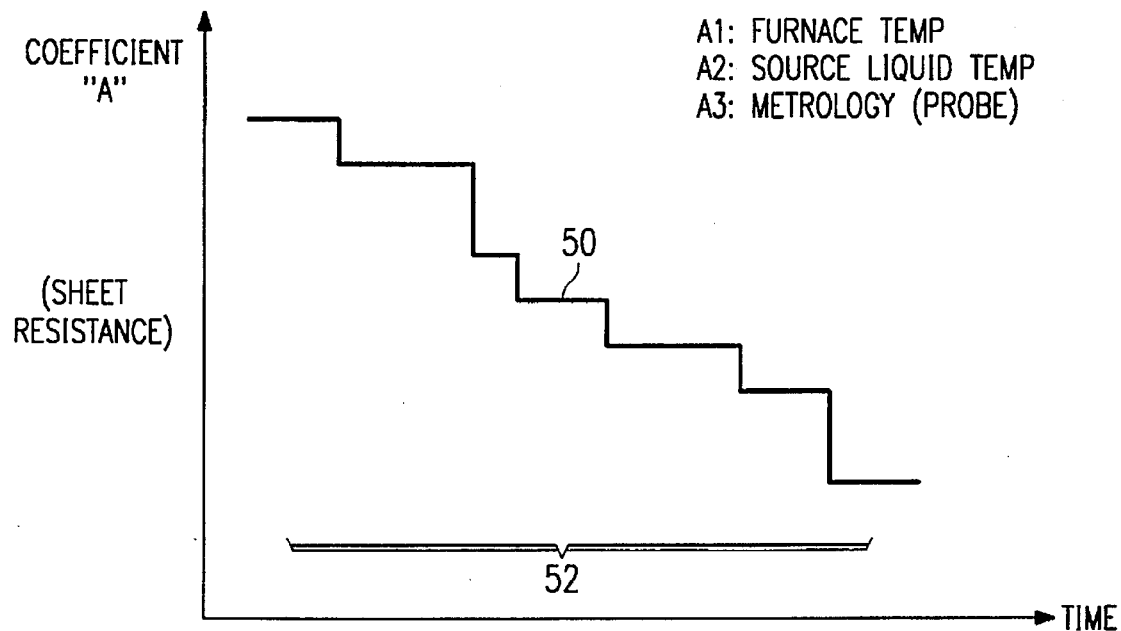
FIGS. 3A, 3B, and 3C illustrate one embodiment of a multiple model map of coefficient shift data for one piece of equipment according to the teachings of the present invention.
Figure 3B:
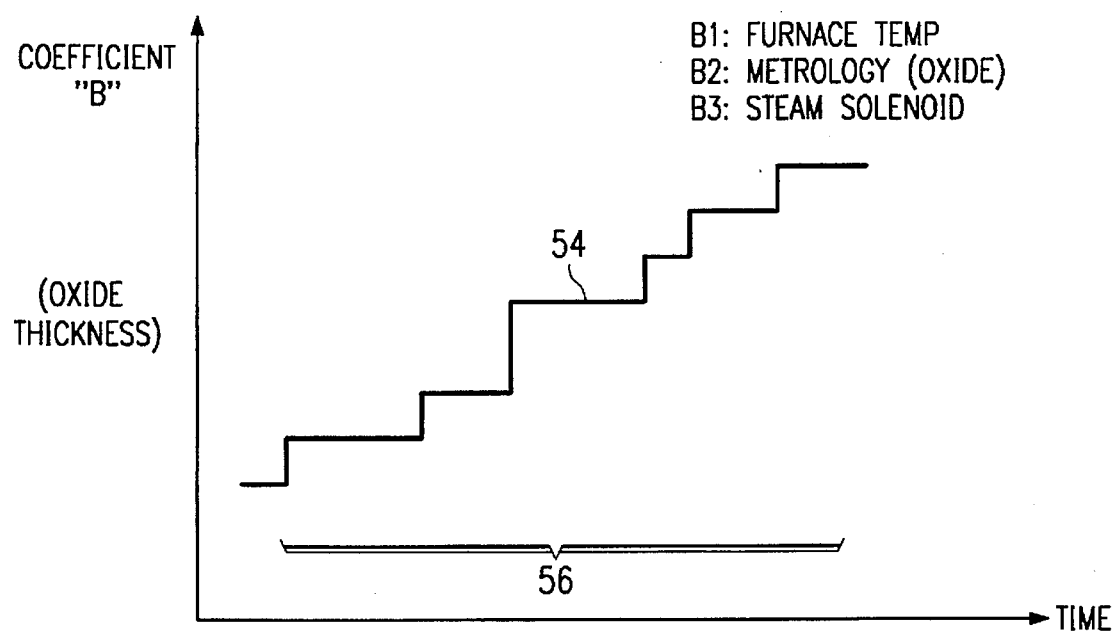
Figure 3C:
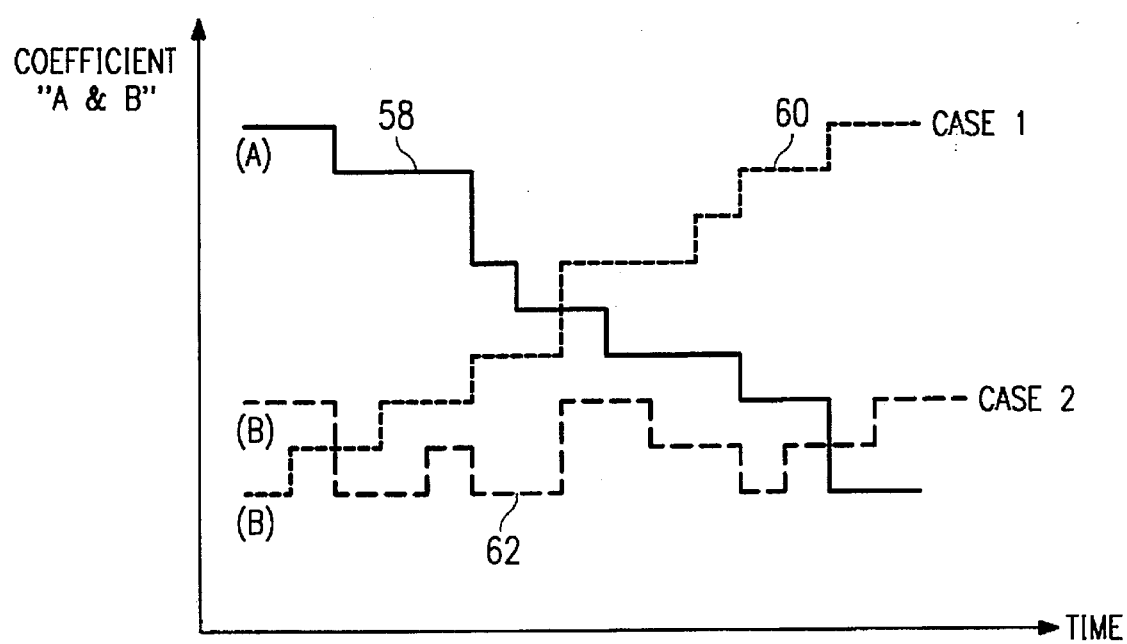

FIGS. 3A, 3B, and 3C illustrate one embodiment of a multiple model map of coefficient shift data for one piece of equipment according to the teachings of the present invention. This embodiment shows multiple traces of multiple coefficients associated with one piece of equipment.

FIG. 3A illustrates a multiple model map of coefficient "A" associated with a deposition machine which produces a layer having a given sheet resistance on a semiconductor wafer. Coefficient shift history 50 shows the shift history for the deposition machine versus time in a region 52. As shown, shift history 50 is decreasing with time in region 52. In this embodiment, there are three probable causes of the increase in coefficient A. The three causes are: A1-the furnace temperature going up, A2-the source liquid temperature going up, and A3-the metrology four point probe is inaccurate for measuring sheet resistance.

FIG. 3B illustrates a map of coefficient "B" associated with oxide thickness deposited by the deposition machine. Coefficient shift history 54 represents the map of coefficient B versus time in region 56. In the illustrated embodiment, the cause of the increase in coefficient B is from three probable sources. The three sources are: B1-furnace temperature going up, B2-metrology equipment for measuring the oxide is wrong, and B3-a leaking steam solenoid.

FIG. 3C illustrates a multiple model map for the single deposition machine. As shown, coefficients A and B are mapped against time. Shift history 58 represents a map of coefficient A with a similar decreasing pattern as to that shown in FIG. 3A. Thus, the same probable root causes are suspected. Coefficient history 60 represents a mapping of coefficient B and is similar to that shown in FIG. 3B. Shift history 60 is referred to as CASE 1. As in FIG. 3B, the probable root causes for CASE 1 are the same as those discussed with respect to FIG. 3B. Coefficient history 62 represents a second mapping of coefficient B and is labeled as CASE 2. In CASE 2, coefficient B remains relatively stable.

According to the teachings of the present invention, the mapping of multiple model coefficients against a common domain as in FIG. 3C provides an ability to identify and rule out probable root causes. For example, in CASE 1, mapping coefficient history 58 and coefficient history 60 points strongly to the furnace temperature going up as the common root cause. This is true because an increase in furnace temperature is a probable root cause of both the decrease in coefficient A and the increase in coefficient B. In one embodiment, the most probable cause of the furnace temperature going up would be the profile thermocouple. Thus, an engineer or operator would be able to check the thermocouple first to determine if that is the root cause of the problems with the deposition machine.

With respect to CASE 2, there is no problem with coefficient B. Consequently, the probable root causes associated with the increase in coefficient B can be ruled out. Additionally, one of the root causes of the decrease in coefficient A can be ruled out because it is also a root cause of an increase in coefficient B (which has not occurred). In CASE 2, the root cause of the furnace temperature going up can be ruled out as a root cause of the decrease of coefficient A because coefficient B is not also increasing.

Model information such as that mapped in FIG. 3C with respect to a single piece of equipment can be evaluated as well as information related to other pieces of equipment in order to determine equipment specific root causes and environmental root causes.

A technical advantage of the present invention is the ability to supervise multiple models each running self tuning processes with respect to manufacturing equipment. An engineer or operator is allowed to supervise whether the equipment is operating as it is supposed to operate. In addition, an engineer or operator is allowed to view a multiple model map of the coefficient shift history for the manufacturing equipment.

Another technical advantage of the present invention is identification of problems caused by equipment drift and problems caused by environmental change.

A further technical advantage of the present invention is the generation of a multiple model map of coefficients versus a common domain. This provides the ability to perform opportunistic maintenance of the equipment by identifying coefficients that are reaching limits, coefficients that are changing rapidly and coefficients that are changing in parallel for supervised equipment.

Although the present invention has been described in detail, it should be understood that various changes, substitutions, and alterations can be made hereto without departing from the spirit and scope of the invention as defined by the appended claims.

What is claimed is:

1. A multiple model supervisor control system for use in a manufacturing environment including a plurality of model based statistical process control units associated with equipment, the multiple model supervisor control system comprising:

a database which stores model coefficient shift data received from a plurality of model based statistical process control units, the coefficient shift data representing statistically significant drifts in output measurables that are associated with the model based statistical process control units;

a supervisor control unit coupled to the database, the supervisor control unit operable to access the coefficient shift data stored in the database;

a multiple model map of coefficient shift history generated by the supervisor control unit, the multiple model map showing a history of the coefficient shift data for the equipment against a common domain; and a user interface coupled to the supervisor control unit, the user interface operable to provide user access to the multiple model map of coefficient shift history to allow identification of problems caused by equipment drift and problems caused by environmental change.

2. The multiple model supervisor control system of claim 1, further comprising an expert system operable to access the multiple model map of coefficient shift history and to automatically identify problems and previously unidentified problems.

3. The multiple model supervisor control system of claim 1, further comprising:

a pattern database comprising patterns identified as indicating specified problems; and an expert system operable to access pattern database and the multiple model map of coefficient shift history and to automatically identify problems by matching to patterns in the pattern database.

4. The multiple model supervisor control system of claim 1, wherein the common domain comprises time.

5. The multiple model supervisor control system of claim 1, wherein the common domain comprises events.

6. The multiple model supervisor control system of claim 1, wherein the common domain comprises accumulated parameters.

7. The multiple model supervisor control system of claim 1, wherein the supervisor control unit is further operable to generate a multiple model map automatically after coefficient shift data is received by the database.

8. The multiple model supervisor control system of claim 1, wherein the supervisor control unit is further operable to generate a multiple model map automatically at a specified time.

9. A manufacturing environment, comprising:

a plurality of pieces of equipment each operable to produce a product and to provide equipment control settings data;

a plurality of model based statistical process control units, each model based statistical process control unit associated with one of the plurality of pieces of equipment, the model based statistical process control units operable to receive the equipment control settings data and to receive material measurements data and the model based statistical process control units operable to provide control data for associated equipment and to provide coefficient shift data representing statistically significant drifts in associated output measurables;

a database storing model coefficient shift data received from the plurality of model based statistical process control units;

a supervisor control unit coupled to the database, the supervisor control unit operable to access the coefficient shift data stored in the database and to receive domain information;

a multiple model map of coefficient shift history generated by the supervisor control unit, the multiple model map showing a history of the coefficient shift data for each of the plurality of models against a common domain; and a user interface coupled to the supervisor control unit, the user interface operable to provide user access to the multiple model map of coefficient shift history to allow identification of problems caused by machine drift and problems caused by environmental change.

10. The manufacturing environment of claim 9, further comprising an expert system operable to access the multiple model map of coefficient shift history and to automatically identify problems and prior unknown patterns.

11. The manufacturing environment of claim 9, further comprising:

a pattern database comprising patterns identified as indicating specified problems; and an expert system operable to access pattern database and the multiple model map of coefficient shift history and to automatically identify problems by matching to patterns in the pattern database.

12. The manufacturing environment of claim 9, wherein the supervisor control unit is further operable to generate a multiple model map automatically after coefficient shift data is received by the database.

13. The manufacturing environment of claim 9, wherein the supervisor control unit is further operable to generate a multiple model map automatically at a specified time.

14. A method for operating a computer system to provide a multiple model supervisor control system for use in a manufacturing environment including a plurality of model based statistical process control units associated with equipment, the method comprising:

creating a database storing model coefficient shift data received from a plurality of model based statistical process control units, the coefficient shift data representing statistically significant drifts in operation parameters of equipment associated with the model based statistical process control units;

generating a multiple model map of coefficient shift history by showing a history of the coefficient shift data for the equipment against a common domain; and analyzing the multiple model map of coefficient shift history to identify problems caused by machine drift and problems caused by environmental change.

15. The method of claim 14, wherein analyzing the multiple model map of coefficient shift history is accomplished by an expert system to automatically identify problems and new patterns.

16. The method of claim 14, further comprising providing a pattern database comprising patterns identified as indicating specified problems, and wherein analyzing the multiple model map of coefficient shift history is accomplished by an expert system to automatically identify problems by matching to patterns in the pattern database.

17. The method of claim 14, wherein generating a multiple model map uses time as the common domain.

18. The method of claim 14, wherein generating a multiple model map uses events as the common domain.

19. The method of claim 14, wherein generating a multiple model map uses parameter accumulation as the common domain.

20. The method of claim 14, wherein generating the multiple model map is accomplished automatically after coefficient shift data is received in the step of creating.

* * * * *